US012243251B1

United States Patent
Kopf et al.

(10) Patent No.: US 12,243,251 B1
(45) Date of Patent: Mar. 4, 2025

(54) ROBUST CONSISTENT VIDEO DEPTH ESTIMATION

(71) Applicant: Meta Platforms, Inc., Menlo Park, CA (US)

(72) Inventors: Johannes Peter Kopf, Medina, WA (US); Xuejian Rong, Seattle, WA (US); Jia-Bin Huang, Blacksburg, VA (US)

(73) Assignee: Meta Platforms, Inc., Menlo Park, CA (US)

( * ) Notice: Subject to any disclaimer, the term of this patent is extended or adjusted under 35 U.S.C. 154(b) by 273 days.

(21) Appl. No.: 17/548,307

(22) Filed: Dec. 10, 2021

(51) Int. Cl.
*G06T 7/55* (2017.01)
*G06T 7/11* (2017.01)
*G06T 7/30* (2017.01)
*G06T 7/70* (2017.01)

(52) U.S. Cl.
CPC .................. *G06T 7/55* (2017.01); *G06T 7/11* (2017.01); *G06T 7/30* (2017.01); *G06T 7/70* (2017.01); *G06T 2207/10016* (2013.01); *G06T 2207/20081* (2013.01); *G06T 2207/30244* (2013.01)

(58) Field of Classification Search
CPC ..... G06T 7/55; G06T 7/11; G06T 7/30; G06T 7/70; G06T 7/80; G06T 2207/10016; G06T 2207/20081; G06T 2207/30244
See application file for complete search history.

(56) References Cited

U.S. PATENT DOCUMENTS

| | | | |
|---|---|---|---|
| 8,351,685 B2 * | 1/2013 | Ho | H04N 19/61 382/103 |
| 10,504,274 B2 * | 12/2019 | Du | G06T 17/00 |
| 11,210,804 B2 * | 12/2021 | Michielin | G06T 7/246 |
| 11,430,152 B1 * | 8/2022 | Sangappa | G06T 7/50 |
| 11,820,338 B2 * | 11/2023 | Schmalenberg | B60S 1/64 |
| 2019/0102910 A1 * | 4/2019 | Kaneko | G06T 7/13 |
| 2021/0004933 A1 * | 1/2021 | Wong | G06T 7/174 |
| 2022/0076117 A1 * | 3/2022 | Amon | G06T 7/70 |
| 2022/0084232 A1 * | 3/2022 | Guizilini | G01C 21/3837 |
| 2022/0284624 A1 * | 9/2022 | Nimmagadda | G06T 7/75 |
| 2023/0343108 A1 * | 10/2023 | Hemantharaja | G06V 10/82 |

OTHER PUBLICATIONS

Luo et al. ("Consistent video depth estimation." ACM Transactions on Graphics (ToG) 39.4 (2020): 71-1.) (Year: 2020).*

(Continued)

*Primary Examiner* — Edward F Urban
*Assistant Examiner* — Benedict E Lee
(74) *Attorney, Agent, or Firm* — BakerHostetler

(57) ABSTRACT

In particular embodiments, a computing system may receive a video comprising a plurality of image frames. The system may generate, for each image frame in the video, an initial depth map using a machine-learning model. The system may compute a misalignment error indicating depth misalignments in initial depth maps using a reprojection technique. The system may generate, for each image frame in the video, an optimized camera pose and a flexible deformation spline associated with the image frame to minimize the misalignment error. The system may generate, for each image frame in the video, a refined depth map by adjusting the initial depth map associated with the frame using the flexible deformation spline associated with the image frame.

20 Claims, 7 Drawing Sheets

(56) References Cited

OTHER PUBLICATIONS

Zhu et al. ("Object-Based Rendering and 3-D Reconstruction Using a Moveable Image-Based System," in IEEE Transactions on Circuits and Systems for Video Technology, vol. 22, No. 10, pp. 1405-1419, Oct. 2012, doi: 10.1109/TCSVT.2012.2198133.) (Year: 2012).*

Richter et al. ("Multiview super-resolution using high-frequency synthesis in case of low-framerate depth information," 2012 Visual Communications and Image Processing, San Diego, CA, USA, 2012, pp. 1-6, doi: 10.1109/VCIP.2012.6410742.) (Year: 2012).*

Zuo et al. ("Frequency-Dependent Depth Map Enhancement via Iterative Depth-Guided Affine Transformation and Intensity-Guided Refinement," in IEEE Transactions on Multimedia, vol. 23, pp. 772-783, 2021, doi: 10.1109/TMM.2020.2987706. (Year: 2021).*

Agarwal S., et al., "Ceres Solver: Tutorial & Reference," 2010, 1 Page, Retrieved from the internet: URL: http://ceres-solver.org/ [retrieved on Mar. 2, 2021].

Bloesch M., et al., "CodeSLAM—Learning a Compact, Optimisable Representation For Dense Visual SLAM," Computer Vision and Pattern Recognition (CVPR), 2018, pp. 2560-2568.

Bonneel N., et al., "Blind Video Temporal Consistency," ACM Transactions on Graphics (TOG), 2015, vol. 34, No. 6, Article 196, pp. 1-9.

Butler D.J., et al., "A Naturalistic Open Source Movie for Optical Flow Evaluation," European Conference on Computer Vision (ECCV), 2012, pp. 611-625.

Casser V., et al., "Depth Prediction Without the Sensors: Leveraging Structure for Unsupervised Learning From Monocular Videos," Proceedings of the AAAI Conference on Artificial Intelligence, 2019, vol. 33, No. 1, pp. 8001-8008.

Chen D., et al., "Coherent Online Video Style Transfer," Proceedings of the IEEE International Conference on Computer Vision (ICCV), 2017, pp. 1105-1114.

Chen W., et al., "Learning Single-Image Depth From Videos Using Quality Assessment Networks," Proceedings of the IEEE/CVF Conference on Computer Vision and Pattern Recognition (CVPR), 2019, pp. 5604-5613.

Chen W., et al., "Oasis: A Large-Scale Dataset for Single Image 3D in the Wild," Proceedings of the IEEE/CVF Conference on Computer Vision and Pattern Recognition (CVPR), 2020, pp. 679-688.

Chen W., et al., "Single-Image Depth Perception in the Wild," Part of Advances in Neural Information Processing Systems 29 (NIPS), 2016, 9 pages.

Dai A., et al., "ScanNet: Richly-Annotated 3D Reconstructions of Indoor Scenes," Proceedings of the IEEE Conference on Computer Vision and Pattern Recognition (CVPR), 2017, pp. 5828-5839.

Dai Q., et al., "Self-Supervised Object Motion and Depth Estimation from Video," arXiv preprint arXiv:1912.04250, 2019, 10 pages.

Eigen D., et al., "Depth Map Prediction from a Single Image Using a Multi-Scale Deep Network," Neural Information Processing Systems (NeurIPS), 2014, 9 pages.

Eigen D., et al., "Predicting Depth, Surface Normal and Semantic Labels With a Common Multi-Scale Convolutional Architecture," International Conference on Computer Vision (ICCV), 2015, pp. 2650-2658.

Engel J., et al., "Direct Sparse Odometry," IEEE Transactions on Pattern Analysis and Machine Intelligence, 2017, vol. 40, No. 3, pp. 611-625.

Engel J., et al., "LSD-SLAM: Large-Scale Direct Monocular SLAM," European Conference on Computer Vision (ECCV), 2014, pp. 834-849.

Fu H., et al., "Deep Ordinal Regression Network for Monocular Depth Estimation," Proceedings of the IEEE Conference on Computer Vision and Pattern Recognition (CVPR), 2018, pp. 2002-2011.

Furukawa Y., et al., "Multi-View Stereo: A Tutorial," Foundations and Trends® in Computer Graphics and Vision, 2015, vol. 9, No. 1-2, pp. 1-148.

Godard C., et al., "Digging into Self-Supervised Monocular Depth Estimation," Proceedings of the IEEE/CVF International Conference on Computer Vision (ICCV), 2019, pp. 3828-3838.

Godard C., et al., "Unsupervised Monocular Depth Estimation with Left-Right Consistency," Computer Vision and Pattern Recognition (CVPR), 2017, pp. 270-279.

Gordon A., et al., "Depth from Videos in the Wild: Unsupervised Monocular Depth Learning from Unknown Cameras," Proceedings of the IEEE/CVF International Conference on Computer Vision (ICCV), 2019, pp. 8977-8986.

Guo X., et al., "Learning Monocular Depth by Distilling Cross-Domain Stereo Networks," European Conference on Computer Vision (ECCV), 2018, pp. 484-500.

Huang J., et al., "6-DOF VR Videos with a Single 360-Camera," IEEE Virtual Reality (VR), 2017, 9 pages.

Huang J-B., et al., "Temporally Coherent Completion of Dynamic Video," ACM Transactions on Graphics (Proc. SIGGRAPH Asia), 2016, vol. 35, No. 6, pp. 1-11.

Huang P-H., et al., "DeepMVS: Learning Multi-View Stereopsis," Computer Vision and Pattern Recognition (CVPR), 2018, pp. 2821-2830.

Im S., et al., "DPSNet: End-to-End Deep Plane Sweep Stereo," International Conference on Learning Representations (ICLR), 2019, 12 pages.

Jatavallabhula K.M., et al., "gradSLAM: Dense Slam Meets Automatic Differentiation," arXiv, 2020, 12 pages.

Karsch K., et al., "Depth Transfer: Depth Extraction from Video Using Non-Parametric Sampling," Transactions on Pattern Analysis and Machine Intelligence (TPAMI), Nov. 1, 2014, vol. 36, No. 11, pp. 2144-2158.

Kusupati U., et al., "Normal Assisted Stereo Depth Estimation," Proceedings of the IEEE/CVF Conference on Computer Vision and Pattern Recognition (CVPR), 2020, pp. 2189-2199.

Lai W.S., et al., "Learning Blind Video Temporal Consistency," Proceedings of the European Conference on Computer Vision (ECCV), 2018, pp. 170-185.

Laina I., et al., "Deeper Depth Prediction With Fully Convolutional Residual Networks," Fourth International Conference on 3D Vision (3DV), 2016, 12 pages.

Lang M., et al., "Practical Temporal Consistency for Image-based Graphics Applications," ACM Transactions on Graphics (ACM), 2012, vol. 31, No. 4, pp. 1-8.

Li H., et al., "Unsupervised Monocular Depth Learning in Dynamic Scenes," Conference on Robot Learning (CoRL), 2020, 11 pages.

Li R., et al., "Undeepvo: Monocular Visual Odometry Through Unsupervised Deep Learning," IEEE International Conference on Robotics and Automation (ICRA), 2018, 6 pages.

Li Z., et al., "Learning the Depths of Moving People by Watching Frozen People," Proceedings of the IEEE/CVF Conference on Computer Vision and Pattern Recognition (CVPR), 2019, pp. 4521-4530.

Li Z., et al., "Megadepth: Learning Single-view Depth Prediction from Internet Photos," Proceedings of the IEEE Conference on Computer Vision and Pattern Recognition (CVPR), 2018, pp. 2041-2050.

Liu C., et al., "Neural RGB(r)D Sensing: Depth and Uncertainty From a Video Camera," Computer Vision and Pattern Recognition (CVPR), 2019, pp. 10986-10995.

Liu F., et al., "Content-Preserving Warps for 3D Video Stabilization," ACM Transactions on Graphics (ACM), 2009, vol. 28, No. 3, pp. 1-9.

Liu F., et al., "Learning Depth From Single Monocular Images Using Deep Convolutional Neural Fields," IEEE Transactions on Pattern Analysis and Machine Intelligence (TPAMI), 2015, vol. 38, No. 10, pp. 2024-2039.

Luo X., et al., "Consistent Video Depth Estimation," ACM Transactions on Graphics (ACM), 2020, vol. 39, No. 4, pp. 71:1-71:13.

Mayer N., et al., "A Large Dataset to Train Convolutional Networks for Disparity, Optical Flow, and Scene Flow Estimation," Computer Vision and Pattern Recognition (CVPR), 2016, pp. 4040-4048.

Mur-Artal R., et al., "ORB-SLAM2: An Open-Source SLAM System for Monocular, Stereo, and RGB-D Cameras," IEEE Transactions on Robotics, 2017, vol. 33, No. 5, pp. 1255-1262.

(56) References Cited

OTHER PUBLICATIONS

Newcombe R. A., et al., "DTAM: Dense Tracking and Mapping in Real-Time," International Conference on Computer Vision (ICCV), 2011, 8 pages.
Nister D., et al., "Visual Odometry," Computer Vision and Pattern Recognition (CVPR), 2004, 8 pages.
Patil V., et al., "Don't Forget the Past: Recurrent Depth Estimation from Monocular Video," arXiv:2001.02613, 2020, 8 pages.
Perazzi F., et al., "A Benchmark Dataset and Evaluation Methodology for Video Object Segmentation," Proceedings of the IEEE Conference on Computer Vision and Pattern Recognition (CVPR), 2016, pp. 724-732.
Pont-Tuset J., et al., "The 2017 DAVIS Challenge on Video Object Segmentation," arXiv:1704.00675, 2017, 6 pages.
Qi X., et al., "GeoNet: Geometric Neural Network for Joint Depth and Surface Normal Estimation," Computer Vision and Pattern Recognition (CVPR), 2018, pp. 283-291.
Ranftl R., et al., "Dense Monocular Depth Estimation in Complex Dynamic Scenes," Computer Vision and Pattern Recognition (CVPR), 2016, pp. 4058-4066.
Ranftl R., et al., "Towards Robust Monocular Depth Estimation: Mixing Datasets for Zero-Shot Cross-dataset Transfer," Transactions on Pattern Analysis and Machine Intelligence (TPAMI), 2020, 14 pages.
Ranjan A., et al., "Competitive Collaboration: Joint Unsupervised Learning of Depth, Camera Motion, Optical Flow and Motion Segmentation," Computer Vision and Pattern Recognition (CVPR), 2019, pp. 12240-12249.
Scaramuzza D., et al., "Visual Odometry [Tutorial]," IEEE Robotics & Automation Magazine, vol. 18, No. 4, 2011, pp. 80-92.
Schonberger J.L., et al., "Structure-from-Motion Revisited," IEEE Conference on Computer Vision and Pattern Recognition (CVPR), 2016, pp. 4104-4113.
Seitz S. M., et al., "A Comparison and Evaluation of Multi-View Stereo Reconstruction Algorithms," In Computer Vision and Pattern Recognition (CVPR), 2006, 8 pages.
Sheng L., et al., "Unsupervised Collaborative Learning of Keyframe Detection and Visual Odometry Towards Monocular Deep SLAM," International Conference on Computer Vision (ICCV), 2019, pp. 4302-4311.
Sturm J., et al., "A Benchmark for the Evaluation of RGB-D Slam Systems," International Conference on Intelligent Robot Systems (IROS), 2012, 8 pages.
Teed Z., et al., "DeepV2D: Video to Depth with Differentiable Structure from Motion," International Conference on Learning Representations (ICLR), 2020, 20 Pages.
Teed Z., et al., "RAFT: Recurrent All-Pairs Field Transforms for Optical Flow," In Computer Vision—ECCV 2020—16th European Conference, Proceedings, Part II, Aug. 23-28, 2020, 17 pages.

Ummenhofer B., et al., "DeMoN: Depth and Motion Network for Learning Monocular Stereo," Computer Vision and Pattern Recognition (CVPR), 2017, pp. 5038-5047.
Valentin J., et al., "Depth from Motion for Smartphone AR," ACM Trans, Graph, Nov. 2018, vol. 37 (6), Article 193, pp. 1-19.
Vijayanarasimhan S., et al., "SfM-Net: Learning of Structure and Motion from Video," arXiv:1704.07804, 2017, 9 pages.
Wang C., et al., "Web Stereo Video Supervision for Depth Prediction from Dynamic Scenes," International Conference on 3D Vision (3DV), 2019, 10 pages.
Wang S., et al., "DeepVo: Towards End-to-End Visual Odometry with Deep Recurrent Convolutional Neural Networks," International Conference on Robotics and Automation (ICRA), 2017, 8 pages.
Wang T-C., et al., "Video-to-Video Synthesis," arXiv: 1808.06601v2, Dec. 8, 2018, 14 pages.
Watson J., et al., "Self-Supervised Monocular Depth Hints," International Conference on Computer Vision (ICCV), 2019, pp. 2162-2171.
Xue F., et al., "Beyond Tracking: Selecting Memory and Refining Poses for Deep Visual Odometry," Computer Vision and Pattern Recognition (CVPR), 2019, pp. 8575-8583.
Yang N., et al., "Challenges in Monocular Visual Odometry: Photometric Calibration, Motion Bias, and Rolling Shutter Effect," IEEE Robotics and Automation Letters, 2018, vol. 3, No. 4, pp. 2878-2885.
Yang N., et al., "D3VO: Deep Depth, Deep Pose and Deep Uncertainty for Monocular Visual Odometry," Computer Vision and Pattern Recognition (CVPR), 2020, pp. 1281-1292.
Yao Y., et al., "MVSNet: Depth Inference for Unstructured Multiview Stereo," European Conference on Computer Vision (ECCV), 2018, pp. 767-783.
Yin Z., et al., "GeoNet: Unsupervised Learning of Dense Depth, Optical Flow and Camera Pose," Computer Vision and Pattern Recognition (CVPR), 2018, pp. 1983-1992.
Yoon J.S., et al., "Novel View Synthesis of Dynamic Scenes With Globally Coherent Depths From a Monocular Camera," Computer Vision and Pattern Recognition (CVPR), 2020, pp. 5336-5345.
Zhan H., et al., "Unsupervised Learning of Monocular Depth Estimation and Visual Odometry With Deep Feature Reconstruction," Computer Vision and Pattern Recognition (CVPR), 2018, pp. 340-349.
Zhou H., et al., "DeepTAM: Deep Tracking and Mapping," European Conference on Computer Vision (ECCV), 2018, pp. 822-838.
Zhou T., et al., "Unsupervised Learning of Depth and Ego-Motion From Video," Computer Vision and Pattern Recognition (CVPR), 2017, pp. 1851-1858.
Zou Y., et al., "DF-Net: Unsupervised Joint Learning of Depth and Flow using Cross-Task Consistency," European Conference on Computer Vision (ECCV), 2018, pp. 36-53.
Zou Y., et al., "Learning Monocular Visual Odometry via Self-Supervised Long-Term Modeling," European Conference on Computer Vision (ECCV), 2020, 18 pages.

* cited by examiner

| | | | | | | |
|---|---|---|---|---|---|---|
| Depth: | Ground Truth | Ground Truth | Estimated | Estimated | Estimated | Estimated |
| Pose Optimization: | None | Estimated/Fixed | Estimated/Fixed | Estimated/Fixed | Optimized/Flexible | Optimized/Flexible |
| Depth Refinement: | None | None | None | Prior Fine-tuning Filter | None | Geometry-aware Depth Filter |
| | FIG. 2A | FIG. 2B | FIG. 2C | FIG. 2D | FIG. 2E | FIG. 2F |

ROBUST CONSISTENT VIDEO DEPTH ESTIMATION

TECHNICAL FIELD

This disclosure generally relates to a robust consistent video depth estimation and camera pose optimization technique. In particular, the disclosure relates to estimating consistent dense depth maps and precise camera poses from a monocular video.

BACKGROUND

Dense per-frame depth is an important intermediate representation that is useful for many video-based applications, such as 3D video stabilization, augmented reality (AR) and special video effects, and for converting videos for virtual reality (VR) viewing. However, estimating accurate and consistent depth maps for casually captured videos is challenging. It is difficult to estimate depth especially with one camera and from a dynamic scene containing moving objects, such as people, vehicles, animals, etc. It is also challenging to estimate accurate and consistent depth maps in a cell phone video since there are a lot of degradations involved. For instance, cell phones contain small image sensors that may produce noisy images, especially in low lighting situations. They use a rolling shutter that may result in wobbly image deformations. Handheld captured casual videos often contain camera shake and motion blur. In addition to all these degradations, there exist well-known problems for 3D reconstruction that are not specific to video, including poorly textured image regions, repetitive patterns, and occlusions.

Prior algorithms for dense reconstruction often have difficulties meeting with above challenges. For instance, an algorithm based on Structure from Motion (SFM) and Multi-view Stereo (MVS) suffers from the limitations of accuracy and availability of correspondence and often fails entirely, as explained below, preventing further processing. Even when SFM succeeds, the MVS reconstructions typically contain a significant amount of holes and noises. Learning-based algorithms are better equipped to handle with this situation. Instead of matching points across frames and geometric triangulation, they employ priors learned from diverse training datasets. This enables them to handle many of the challenging situations aforementioned. However, the estimated depth is only defined up to scale, and, while plausible, is not necessarily accurate, i.e., it lacks geometric consistency.

Hybrid algorithms achieve desirable characteristics of both approaches (i.e., SFM and learning-based approaches) by combining learnt priors with geometric reasoning. These methods often assume precise per-frame camera poses (e.g., camera position and orientation) as auxiliary inputs, which are typically estimated with SFM. However, SFM algorithms are not robust to the issues described above. In such situations, SFM might fail to register all frames or produce outlier poses with large errors. Also, a test-time fine-tuning formulation associated with these prior algorithms requires a pre-established geometric relationship between matched pixels across frames, which in turn, requires precisely calibrated camera poses and per-frame depth scale factors. As a consequence, hybrid algorithms work well when the pose estimation succeeds and fail catastrophically when it does not. This problem of robustness makes these algorithms unsuitable for many real-world applications, as they might fail in unpredictable ways. Also, these algorithms or methods may produce erroneous depth estimation and fail to generate accurate camera trajectories for dynamic scenes.

Accordingly, there is a need for an improved algorithm or technique that is able to produce geometrically consistent camera poses and dense depth for a video, such as, for example, a monocular video, a dynamic scene video, a casually captured video, cellphone video, etc. without requiring precise camera poses as input.

SUMMARY OF PARTICULAR EMBODIMENTS

Embodiments described herein relate to a robust consistent video depth estimation algorithm for estimating consistent dense depth maps and camera poses from a video (e.g., monocular video, a dynamic scene video, a casually captured video, cellphone video). The algorithm integrates a learning-based depth prior, in the form of a convolutional neural network trained for single-image depth estimation, with geometric optimization, to estimate a smooth camera trajectory as well as detailed and stable depth reconstruction. The algorithm combines two complementary techniques: (1) flexible deformation-splines for low-frequency large-scale alignment and (2) geometry-aware depth filtering for high-frequency alignment of fine depth details.

In particular embodiments, low-frequency large scale depth alignment may be achieved through an optimization process by an optimizer. The optimization process may include jointly estimating the camera poses of images frames of a video and refined depth maps. For instance, the optimizer may try to find the optimal camera pose (e.g., position, orientation, rotation, translation) and other camera parameters (e.g., intrinsic parameters, camera distortion, etc.) and a deformation spline (e.g., a deformed 17×17 grid) for deforming initial depth map of each frame (e.g., estimated using a convolutional neural network trained for single-image depth estimation) such that the depth maps align better or the misalignments or low-frequency inconsistencies are resolved. In particular embodiments, deforming the depth map using the deformation spline optimizes the camera pose for an image frame. For instance, the improved alignment of the depth estimates enables computing smoother and more accurate pose trajectories.

In particular embodiments, a misalignment or a reprojection error may be used to drive the optimization process (e.g., depth deformation process). The misalignment or reprojection error may be computed using a reprojection technique. In particular embodiments, static objects may be identified (e.g., using an image segmentation technique) in the images and used in the reprojection technique to compute the misalignment or reprojection error. The misalignment or reprojection error may indicate a difference between a reprojected location of a static object and a tracked location of a static object within an image frame. This difference is then used to estimate or generate a deformation spline to deform the initial depth map associated with the image frame. A refined depth map may be generated by adjusting the initial depth map using the deformation spline. In particular embodiments, the refined depth maps that are generated, using the optimization process (e.g., joint pose estimation and depth deformation process), aligns the depth maps in 3D and resolve any large-scale misalignments.

In particular embodiments, the robust consistent video depth estimation algorithm discussed herein may perform an optional post processing step to further refine or filter the refined depth maps. For instance, the refined depth maps, generated after the optimization process, may be further refined or filtered using a geometry-aware depth filter to improve high-frequency (or pixel-level) alignment and remove any residual jitter. The geometry-aware depth filter is capable of bringing out fine depth details, rather than blurring them because of the precise alignment from the optimization process.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
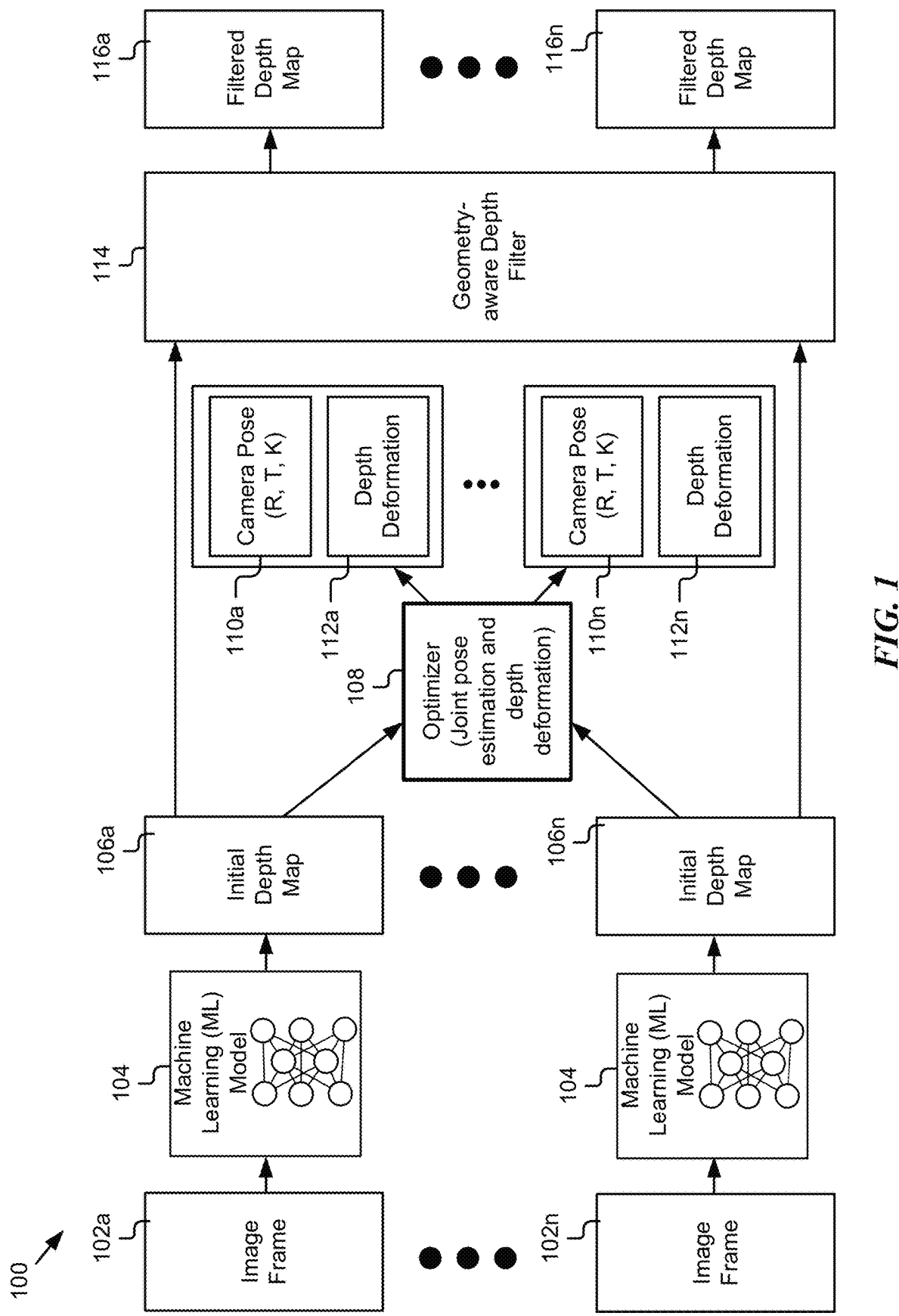
FIG. 1 illustrates an example block diagram of estimating consistent dense depth maps and optimized camera poses from a video, in accordance with particular embodiments.

Embodiments described herein relate to a robust consistent video depth estimation algorithm for estimating consistent dense depth maps and camera poses from a video (e.g., monocular video, a dynamic scene video, a casually captured video, cellphone video). The algorithm integrates a learning-based depth prior, in the form of a convolutional neural network trained for single-image depth estimation, with geometric optimization, to estimate a smooth camera trajectory as well as detailed and stable depth reconstruction. The algorithm combines two complementary techniques: (1) flexible deformation-splines for low-frequency large-scale alignment and (2) geometry-aware depth filtering for high-frequency alignment of fine depth details.

The robust consistent video depth estimation algorithm discussed herein is advantageous in a number of ways. For instance, in contrast to prior approaches for depth estimation, the improved algorithm or method discussed herein does not require precise camera poses as input and achieves robust reconstruction of depth for challenging hand-held cell phone captures containing a significant amount of noise, shake, motion blur, and rolling shutter deformations. Also, as discussed in the background section, the learning-based prior is resilient to moderate amounts of dynamic motion. The method discussed herein is even more robust to large dynamic motion as it incorporates automatic segmentation-based masks to relax the geometric alignment requirements in regions containing dynamic objects, such as people, vehicles, and animals.

The robust consistent video depth estimation algorithm discussed herein leverages a convolutional neural network trained for single-image depth estimation as a depth prior and optimize the alignment of the depth maps. In contrast to the prior/traditional fine-tuning formulation that requires a pre-established geometric relationship between matched pixels across frames, which, in turn, requires precisely calibrated camera poses and per-frame depth scale factors, the improved algorithm or method discussed herein jointly optimize extrinsic and intrinsic camera pose parameters as well as 3D alignment of the estimated depth maps using continuous optimization (e.g., through a flexible deformation spline).

Previous alignment using rigid-scale transformations does not result in accurate poses because the independently estimated per-frame depth maps usually contain random inaccuracies. These further lead to misalignment, which inevitably imposes noisy errors onto the estimated camera trajectory. The technique discussed herein resolve it by turning to a more flexible deformation model, using spatially-varying splines. They provide a more exact alignment, which, in succession, results in smoother and more accurate trajectories. The spline-based deformation achieves accurate low-frequency alignment. To further improve high-frequency details and remove residual jitter, the improved algorithm or method discussed herein uses a geometry-aware depth filter. This filter is capable of bringing out fine depth details, rather than blurring them because of the precise alignment from the previous stage (e.g., optimization stage/process).

Figure 3:
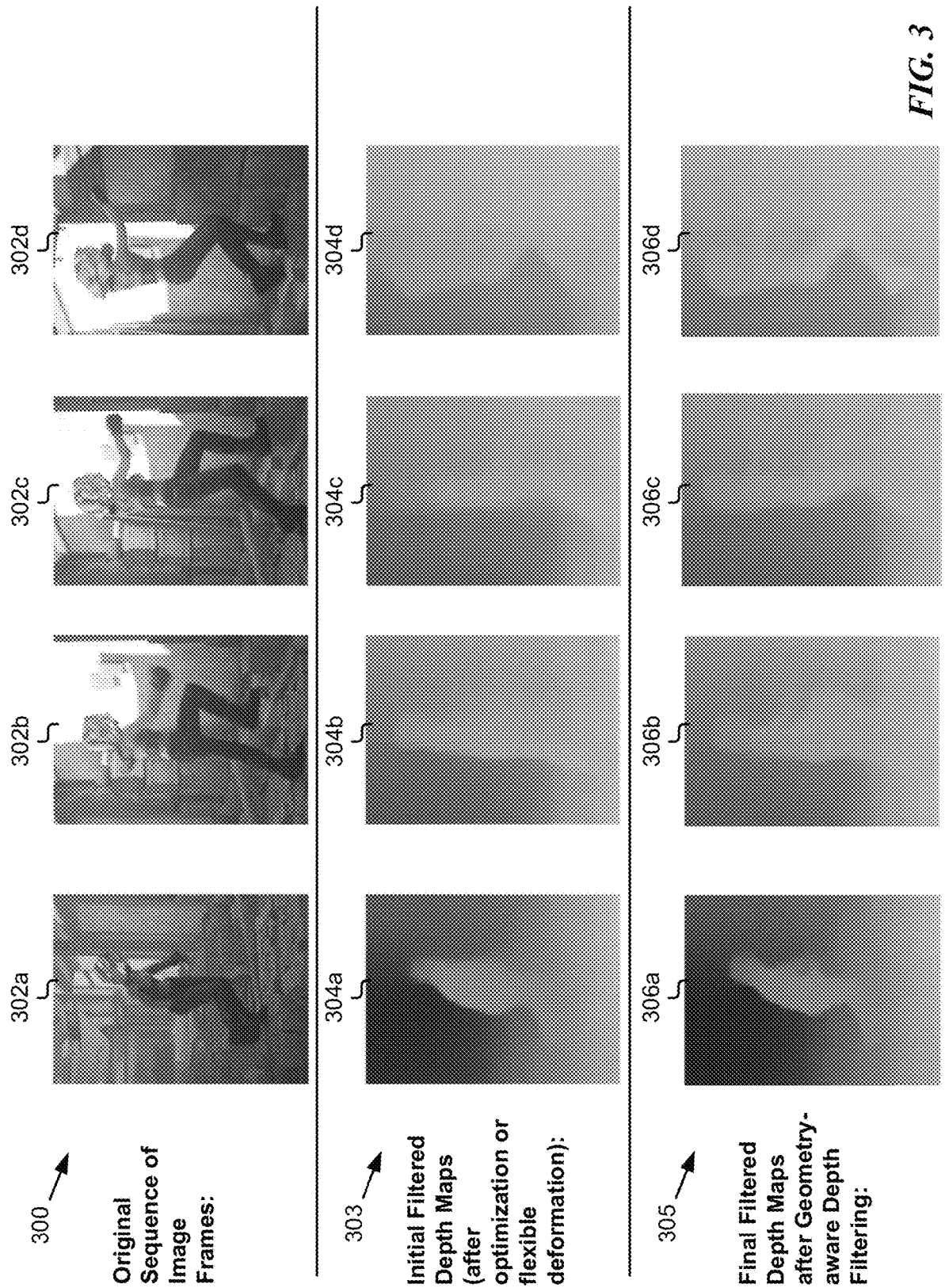
FIG. 3 illustrates an example comparison between depth estimates obtained before and after applying a geometry-aware depth filter discussed herein, in accordance with particular embodiments.
Figure 6:
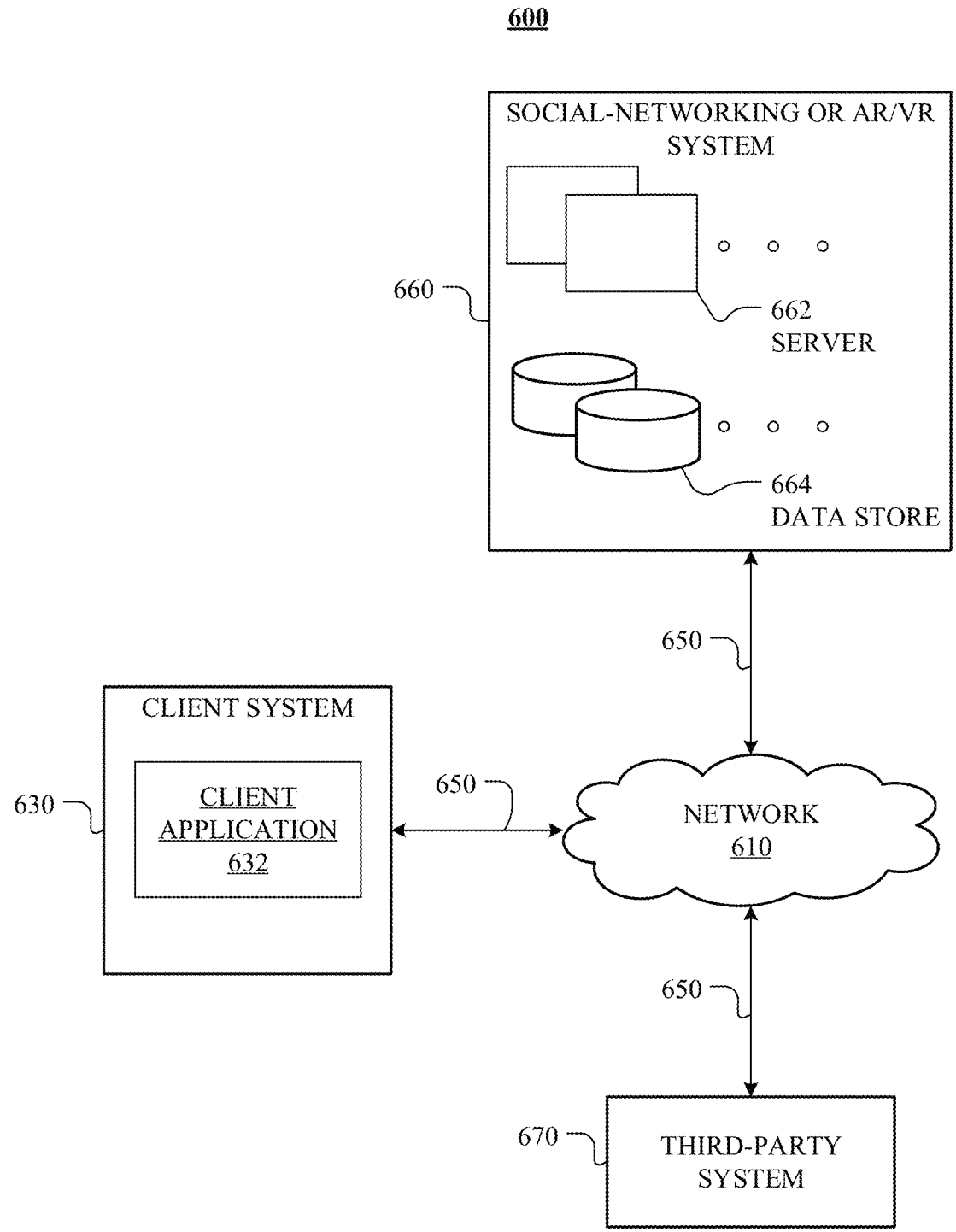
FIG. 6 illustrates an example network environment associated with a social-networking system, an augmented reality, or a virtual-reality system.

FIG. 1 illustrates an example block diagram 100 of estimating consistent dense depth maps and optimized camera poses from a video. In particular, the block diagram 100 illustrates steps performed by the robust consistent depth video estimation algorithm discussed herein for estimating consistent dense depth maps and optimized camera poses. The algorithm begins by receiving a video (e.g., monocular color video) as input. The video may include a sequence of image frames 102a, 102b, . . . 102n (also individually or collectively herein referred to as 102). In some embodiments, the monocular video comprising the sequence of image frames 102 may be captured using a camera of a user device (e.g., client system 630 as shown in FIG. 6). As an example and not by way of limitation, the sequence of image frames 102 may be image frames 302a, 302b, 302c, and 302d, as shown in FIG. 3.

Although not shown in FIG. 1, one or more pre-processing steps may be performed on the image frames 102 prior to their depth estimation. One of the pre-processing steps may include identifying static and dynamic objects in the images. The identified static objects may be used later on for identifying depth misalignments or inconsistencies and in the optimization process 108. A static object in an image frame may represent an object that is still and not moving. For example, the static object in the sequence of image frames 102 may be a leaf that is present in all the images at approximately the same location. Conversely, dynamic objects refer to objects that are dynamic and constantly moving, such as, for example, person, animals, vehicles, etc. In particular embodiments, an image segmentation technique such as a binary segmentation mask $m^{dyn}$ using Mask R-CNN may be used to identify pixels corresponding to static and dynamic objects in the images. Another pre-processing step may include subsampling a set of image frame pairs spanning temporally near and distant frames in order to lower the overall amount of computation in the pairwise optimization.

Responsive to performing the one or more pre-processing steps discussed above, the robust consistent depth video estimation algorithm may use a trained machine-learning (ML) model 104 to estimate or generate initial dense depth maps 106a, 106b, . . . 106n (also individually or collectively herein referred to as 106) corresponding to the image frames 102a, 102b, . . . 102n. As an example, the ML model 104 may be used to generate an initial depth map 106a corresponding to the image frame 102a and an initial depth map 106n corresponding to the image frame 102n. Although only two image frames 102 and corresponding depth maps 106 are illustrated in FIG. 1, it should be noted that this is not by any way limiting and this disclosure contemplates additional images frames and corresponding depth maps.

In particular embodiments, the ML model 104 used herein is a convolutional neural network trained for single-image depth estimation. In one embodiment, the ML model 104 may be based on supervised learning-based single-image depth estimation. For instance, the ML model 104 may be trained based on a diverse set of training images with corresponding ground-truth depth maps that may be obtained using synthetic datasets, crowd-sourced human annotations of relative depth, 3D surfaces, pseudo ground-truth depth maps from internet images/videos or 3D movies, etc. In some embodiments, the ML model 104 discussed herein may be based on a self-supervised approach for learning single-image depth estimation models. Some examples may include learning from stereo pairs or monocular videos.

As discussed elsewhere herein, the estimated or initial depth maps 106 that are generated using the ML model 104 (e.g., pretrained single-image depth estimation model) may not be geometrically consistent across different frames. For instance, the estimated or initial depth maps 106 may include misalignments in estimated depth that impose jittery errors and/or may appear to be flickering, as shown for example in FIGS. 2C-2D and 3. In some embodiments, the depth misalignment may occur due to inconsistencies between locations of same objects (e.g., static objects) within the images. These depth misalignments in the initial/estimated depth maps 106 may be resolved or corrected with the help of an optimizer 108, which jointly estimates and/or optimizes camera poses as well as flexible deformations to align the depth maps in 3D and resolve any large-scale misalignments, as discussed in further detail below.

Figure 4:
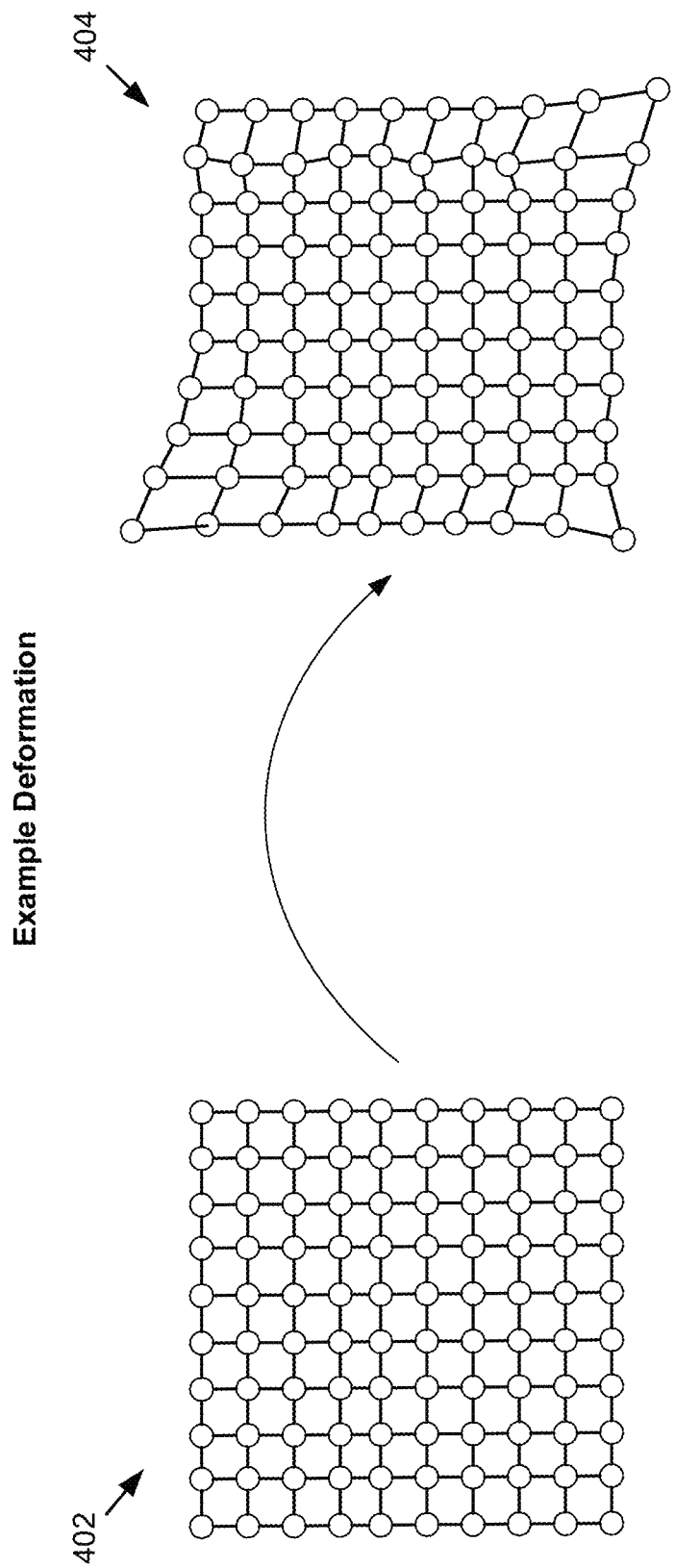
FIG. 4 illustrates an example deformation for resolving depth misalignments based on the optimization technique discussed herein.

In particular embodiments, upon obtaining initial depth estimates for the image frames 102 from the machine-learning model 104, the robust consistent depth estimation algorithm may send these initial/estimated depth maps 106 to the optimizer 108 (also interchangeably referred to herein as an optimization solver or an optimization process). The optimizer 108 may be configured to jointly optimize and/or determine camera pose (also interchangeably sometimes referred to herein as camera parameters) and depth deformations (also interchangeably sometimes referred to herein as deformation splines) in order to correct the depth misalignments or to align the depths maps. For instance, the optimizer 108 may be configured to determine, for each image frame 102, one or more of camera pose/parameters (R. T. K) 110a, 110b . . . 110n (also individually or collectively herein referred to as 110) and depth deformations 112a, 112b, . . . 112n (also individually or collectively herein referred to as 112). As an example, the optimizer 108 may generate camera pose/parameter(s) (R. T. K) 110a and a depth deformation 112a corresponding to image frame 102a and camera pose/parameter(s) (R. T. K) 110n and a depth deformation 112n corresponding to the image frame 102n. Here, R represents the camera rotation or rotation matrix, T represents the camera translation, and K represents intrinsic parameters of the camera, such as focal length, aperture, etc. Determining the camera pose 110 may include optimizing or modifying camera position, orientation, rotation, translation, and intrinsic parameters (e.g., focal length, aperture, etc.). For instance, an estimated or initial camera pose may be associated with each image frame 102 and the estimated/initial camera pose may be adjusted or optimized to obtain a smooth camera trajectory. In some embodiments, optimizing the camera pose 110 may be based on the depth deformation 112 (e.g., deforming a depth map using a deformation spline). An initial camera pose associated with an image frame may be adjusted or optimized using a reprojection technique, as discussed elsewhere herein. Determining the depth deformation 112 may include determining a deformation spline (e.g., as shown in FIG. 4) for deforming the depth map such that the depth misalignments are resolved.

In particular embodiments, the optimization process may be initiated in response to computing a misalignment or a reprojection error. In other words, the computed misalignment or reprojection error is used to drive the optimization process. For instance, the misalignment error may be computed to determine a degree of misalignment in depths or how misaligned the initial/estimated depth maps are in 3D. In particular embodiments, the misalignment error may be computed based on comparing a location of a static object in a pair of image frames 102. As an example, let's assume the static object is a leaf in two image frames 102 that are captured one after the other. Since the object (i.e., leaf) is static, the location represented in corresponding depth maps 106 of the pair of image frames 102 should be consistent. If it is not consistent, then that represent a misalignment error. Also, the degree by which it is inconsistent may be used to determine the degree of misalignment.

In particular embodiments, the misalignment or reprojection error discussed herein may be computed using a reprojection technique. The reprojection technique may include a reprojection of a portion of a first frame in the video associated with a first camera pose onto a second camera pose associated with a second frame in the video and then comparing a reprojected location of the portion with a tracked location of the portion to compute the misalignment error. More specifically, computing the misalignment error or reprojection error using the reprojection technique may include (1) determining, for a first point corresponding to a static object in a first image frame, an estimated camera pose and an estimated depth value associated with the first point of the first image frame, (2) projecting the first point corresponding to the static object into a three-dimensional space, (3) reprojecting the first point corresponding to the static object from the three-dimensional space towards a second estimated camera pose associated with a second point corresponding to the static object in a second image frame, 4 comparing the reprojected location of the second point with a tracked location of the second point in the second image frame, and (5) computing a reprojection error based on the comparison. In some embodiments, the reprojection error represents the misalignment error indicating the depth misalignments in the estimated depth maps. It should be noted that the present disclosure is not limited to the reprojection technique discussed herein and other techniques are also possible and within the scope of the present disclosure. For instance, another technique may be an optical flow technique.

Once the misalignment or reprojection error indicating depth misalignments has been determined, it may be used to drive the optimization process. More specifically, the misalignment or reprojection error is used to drive the depth deformation process, which includes determining a deformation spline 112 to deform an initial depth map 106 associated with an image frame 102 such that it aligns with other depth maps and/or images. In particular embodiments, a smooth and flexible spatially-varying depth deformation model may be injected into the alignment procedure. For example, upon determining how off the reprojected location of a static object is with respect to a tracked location, one or more coordinates of a deformation mesh or grid representing the initial depth map 106 may be adjusted along a spline such that the misalignment or inconsistency is resolved. The deformation spline starts off as a uniform grid, such as a uniform grid 402 shown in FIG. 4. Each intersection of the grid could be deformed outward or inward along a ray cast from the camera pose to that grid. This may include moving or adjusting regular grid of "handles" across the image. For instance, within a grid cell the four surrounding handles of a pixel are bilinearly interpolated. Since the grid is a continuous spline, when the grid is used to determine the depth map, the depths of dynamic objects in the scene are also updated. One example deformation is illustrated in FIG. 4. In particular embodiments, deforming the depth map using the deformation spline optimizes the camera pose 110. For instance, the improved alignment of the depth estimates enables computing smoother and more accurate pose trajectories, as shown for example by camera trajectory 206e in FIG. 2E.

Figure 2:
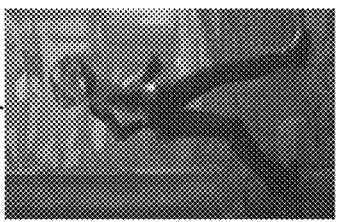
FIG. 2A-2F illustrate example comparisons between depth maps of an example image based on different depth, pose optimization, and depth refinement techniques, in accordance with particular embodiments.

In particular embodiments, an optimized camera pose 110 and an adjusted depth deformation (or deformation spline) 112 determined for each image frame 102, using the optimization process discussed above, may be used to generate a refined depth map, as shown by image 204c in FIG. 2E. For instance, the refined depth map may be generated by adjusting the initial/estimated depth map 106 using the generated depth deformation or deformation spline 112. The refined depth map may be generated for each image frame 102. As an example, a refined depth map may be generated for image frame 102a, a refined depth map may be generated for image frame 102b, a refined depth map may be generated for image frame 102n, etc. In particular embodiments, the refined depth maps that are generated, using the optimization process (e.g., joint pose estimation and depth deformation) by the optimizer 108 discussed herein, aligns the depth maps in 3D and resolve any large-scale misalignments. The improved alignment of the depth estimates enables computing smoother and more accurate pose trajectories, as shown for example by camera trajectory 206e in FIG. 2E.

Once the optimization process (i.e., joint pose estimation and depth deformation) of the optimizer 108 is complete, the robust consistent video depth estimation algorithm may perform an optional post processing step to further refine or filter the refined depth maps. For instance, the refined depth maps, generated after the optimization process, may be further refined or filtered using a geometry-aware depth filter 114 to improve high-frequency (or pixel-level) alignment. Processing the depth maps using the geometry-aware depth filter 114 generates filtered depth maps 116a, 116b . . . 116n (also individually or collectively herein referred to as 116) corresponding to the image frames 102a, 102b . . . 102n. As an example, for image frame 102a, the geometry-aware depth filter 114 may be used to generate a filtered depth map 116a and for image frame 102n, the geometry-aware depth filter 114 may be used to generate a filtered depth map 116n.

In particular embodiments, the geometry-aware depth filter 114 is a low-pass filter that filters the reprojected depth along flow trajectories. The geometry-aware depth filter 114 filters the depth maps across time along the flow trajectory. The filter 114 is geometry-aware in the sense that it transforms the depths from other frames using the reprojection mechanics or technique discussed herein. Because the input to the filter 114 is well-aligned (e.g., due to the depth deformation 112), the filter 114 resolves fine details, rather than blurring them, as shown for example in image 204f in FIG. 2F.

In particular embodiments, the geometry-aware depth filter 114 filters the depth maps by looking at the depth values across several images frames and filtering a depth map in a way that makes the map smooth temporally. By way of an example and not limitation, consider there are 7 image frames in total, 3 frames before a current frame and 3 frames after. The depth values of an object (e.g., a pixel on a leaf) of the 6 neighboring frames is compared to the depth value of the current frame. Depth values that are similar to the current one are given higher weights and dissimilar ones get lower weights. This way, outliers contribute less and strong outliers may be removed. The weighted depth values are used to determine the final depth estimate for that pixel. This would help ensure temporal smoothness.

FIG. 2A-2F illustrate example comparisons between depth maps of an example image 202 based on different depth, pose optimization, and depth refinement techniques. In particular, FIG. 2A shows ground-truth depth map 204a with ground-truth pose 206a. The camera in this case is linearly moving forward and is rotating, as indicated by smooth camera trajectory 206a. FIG. 2B shows ground-truth depth map 204b with estimated/fixed camera pose. Here we are still using the ground truth depth but optimizing the pose. However, there is a little bit of flickering, as indicated by camera trajectory 206b. The real problem starts occurring when the depth is estimated, for example, using a depth estimation model. For instance, FIG. 2C shows estimated depth map 204c generated using the single-image depth estimation model with estimated/fixed camera pose. In this case, there are severe misalignments and camera distortions, as indicated by camera trajectory 206c. FIG. 2D shows estimated depth map 204d generated using the single-image depth estimation model with estimated/fixed camera pose and after applying a fine-tuning depth refinement filter of a prior technique. Even after applying the fine-tuning filter, not much improvement is achieved, as indicated by camera trajectory 206d. FIGS. 2E and 2F shows refinements in the depth estimates after the optimization process 108 and applying the geometry-aware depth filter 114, respectively. In particular, FIG. 2E shows a refined depth map 204c generated using the single-image depth estimated model with optimized/flexible camera pose 206c based on flexible deformation spline technique of FIG. 1. The flexible deformations technique (i.e., using the deformation spline) resolves depth misalignments, which results in smoother camera trajectories 206e. FIG. 2F shows filtered or further refined depth map 204f generated using the single-image depth estimation model with optimized/flexible camera pose 206e and after applying the geometry-aware depth filter of FIG. 1. Using the geometry-aware depth filter, fine depth details are further achieved, as indicated by camera trajectory 206f.

FIG. 3 illustrates an example comparison between depth estimates obtained before and after applying a geometry-aware depth filter discussed herein. As depicted, the top portion 300 represents an example sequence of image frame 302a-302d from which depth estimates or depth maps may be generated. The sequence of image frames 302a-302d may be associated with an input video, such as a monocular video. The middle portion 303 represents depth maps 304a-304d after performing the optimization process (e.g., flexible deformation) by the optimizer 108. The flexible deformation achieves a low-frequency alignment of depth maps i.e., by removing any large-scale misalignments. Fine scale details in these depth maps may be achieved by applying a geometry-aware depth filter 114. The bottom portion 305 represents final filtered depth maps 306a-306d after applying the geometry-aware depth filter 114, as discussed in FIG. 1.

FIG. 4 illustrates an example deformation for resolving depth misalignments based on the optimization technique discussed herein. In particular embodiments, a depth map of an image frame may be represented in the form of a deformation mesh or a grid. The deformation mesh or grid may be of certain dimensions. For example, as depicted, the deformation grid in this case is a 10×10 matrix. Here the deformation mesh 402 represents the initial depth map prior to the optimization and containing depth misalignments or inconsistencies. One or more coordinates of the deformation mesh or grid 402 may be adjusted along a spline such that the misalignments or inconsistencies are resolved. For instance, each intersection of the grid could be deformed outward or inward along a ray cast from the camera pose to that grid. In particular embodiments, the adjustments to the deformation mesh 402 may be made based on the misalignment or reprojection error (e.g., indicating a difference between a reprojected location and a tracked location of a static object within a scene). The adjustments made to the mesh 402 will result into the deformed mesh 404. Using the deformed mesh 404, the depth maps align better and will not impose jittery errors onto an estimated camera trajectory, as shown and discussed in FIG. 2E.

Figure 5:
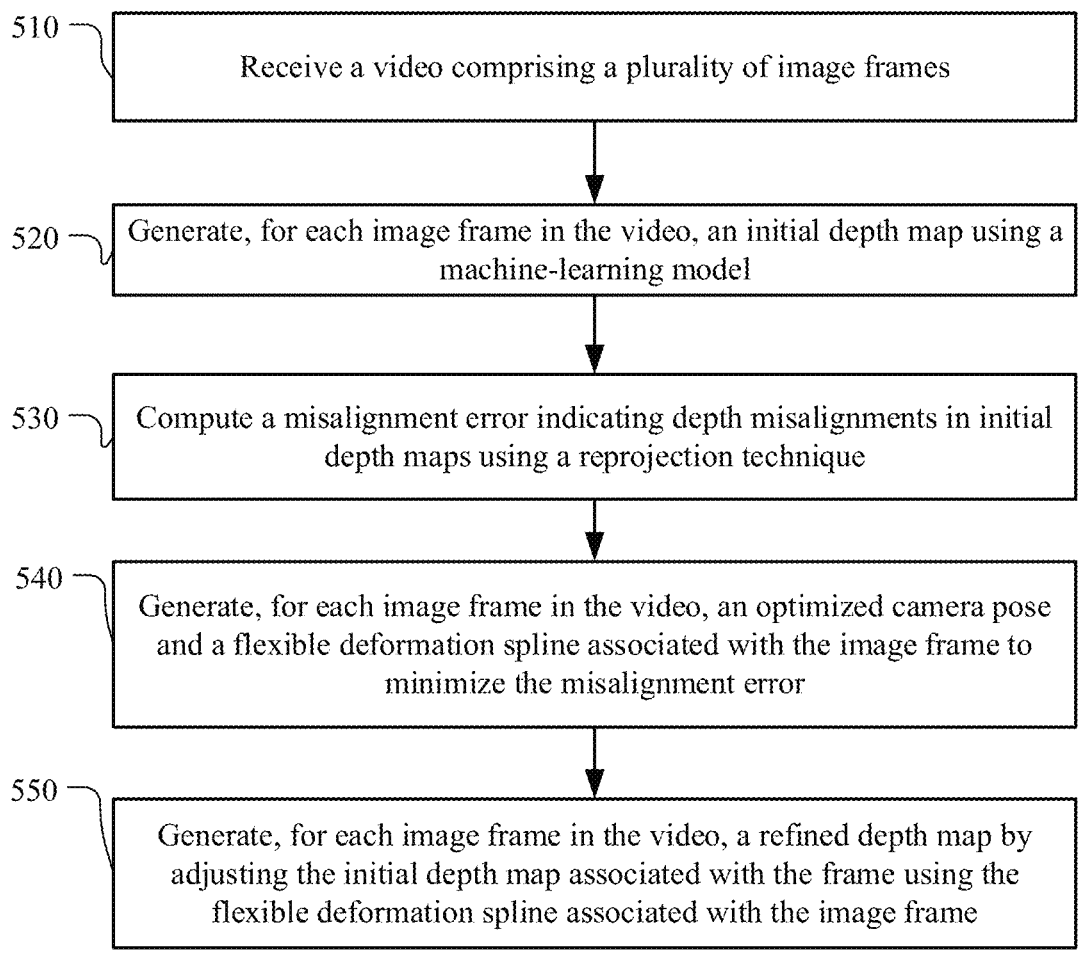
FIG. 5 illustrates an example method for estimating consistent dense depth maps and optimized camera poses from a video, in accordance with particular embodiments.

FIG. 5 illustrates an example method 500 for estimating consistent dense depth maps and optimized camera poses from a video, in accordance with particular embodiments. In particular, the method 500 illustrates steps performed by the robust consistent depth video estimation algorithm discussed herein for estimating consistent dense depth maps and camera poses. The method may begin at step 510, where a computing system may receive a video comprising a plurality of image frames. In particular embodiments, the video is a monocular video that may be captured using a single camera of a user device, such as a client system 630 as shown in FIG. 6. In some embodiments, the video may be an old video that is retrieved from a data storage or memory. The plurality of images frames included in the video may be a temporal sequence of image frames (e.g., temporally occurring one after the other or in a sequential order in time). As an example, the plurality of image frames may be image frames 302a-302d, as shown in the top portion 300 of FIG. 3.

In some embodiments, responsive to receiving the video at step 510, the computing system may identify pixels corresponding to static objects in the plurality of image frames using an image segmentation technique. For instance, a binary segmentation mask using Mask R-CNN may be used to identify pixels corresponding to static and dynamic objects in the images. The identified static objects may be used to compute the misalignment error. For instance, the depth misalignments in the initial depth maps may occur due to inconsistencies between locations of the identified static objects that may be determined using the reprojection technique discussed herein.

At step 520, the computing system may generate, for each image frame in the video, an initial depth map using a machine-learning model. In particular embodiments, the machine-learning model may be a pretrained single-image depth estimation model, as discussed elsewhere herein. The single-image depth estimation model may be trained based on a diverse set of training images with corresponding ground-truth depth maps that may be obtained using synthetic datasets, crowd-sourced human annotations of relative depth, 3D surfaces, pseudo ground-truth depth maps from internet images/videos or 3D movies.

At step 530, the computing system may compute a misalignment error indicating depth misalignments in initial depth maps using a reprojection technique. For instance, the initial depth maps generated by the machine-learning model (e.g., machine-learning model 104) may include misalignments in estimated depth that impose jittery errors, as shown for example in FIGS. 2C-2D and 3. These depth misalignments may occur due to inconsistencies between locations of same objects (e.g., static objects) within the images. In particular embodiments, computing the misalignment error indicating the depth misalignments using the reprojection technique may include (1) determining, for a first portion corresponding to a static object in a first image frame, an estimated camera pose and an estimated depth value associated with the first portion of the first image frame, (2) projecting the first portion corresponding to the static object into a three-dimensional space, (3) reprojecting the first portion corresponding to the static object from the three-dimensional space towards a second estimated camera pose associated with a second portion corresponding to the static object in a second image frame, (4) comparing the reprojected location of the second portion with a tracked location of the second portion in the second image frame, and (5) computing a reprojection error based on the comparison. The reprojection error here is the misalignment error indicating the depth misalignments in the initial depth maps.

At step 540, the computing system may generate, for each image frame in the video, an optimized camera pose and a flexible deformation spline associated with the image frame to minimize the misalignment error. In particular embodiments, generating the optimized camera pose for the image frame may include adjusting one or more of rotation, translation, or intrinsic parameters of the camera. In particular embodiments, generating the flexible deformation spline for the image frame may include adjusting coordinates of a mesh or grid representing the depth map of the image frame along a spline, as shown and discussed in FIG. 4. In particular embodiments, both these adjustments (e.g., camera pose and depth deformation adjustments) may be simultaneously performed by an optimization solver (e.g., the optimizer 108) until the depth maps sufficiently align or the misalignment error is below a certain threshold. In some embodiments, the camera pose optimization may be based on the depth deformation or the flexible deformation spline.

At step 550, the computing system may generate, for each image frame in the video, a refined depth map by adjusting the initial depth map associated with the frame using the flexible deformation spline associated with the image frame. The refined depth maps obtained at step 550 may resolve low-frequency inconsistencies in the initial depth maps (e.g., generated at step 520) or achieve low-frequency depth alignment. In some embodiments, the computing system may further perform an optional post-processing step by applying a geometry-aware depth filter to resolve fine-scale details in the refined depth maps or to achieve high-frequency depth alignment.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for estimating consistent dense depth maps and camera poses from a video, including the particular steps of the method of FIG. 5, this disclosure contemplates any suitable method for estimating consistent dense depth maps and camera poses from a video, including any suitable steps, which may include a subset of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

FIG. 6 illustrates an example network environment 600 associated with an augmented reality (AR)/virtual reality (VR) system or a social-networking system. Network environment 600 includes a client system 630, a VR (or AR) or social-networking system 660, and a third-party system 670 connected to each other by a network 610. Although FIG. 6 illustrates a particular arrangement of client system 630, VR or social-networking system 660, third-party system 670, and network 610, this disclosure contemplates any suitable arrangement of client system 630, AR/VR or social-networking system 660, third-party system 670, and network 610. As an example and not by way of limitation, two or more of client system 630, AR/VR or social-networking system 660, and third-party system 670 may be connected to each other directly, bypassing network 610. As another example, two or more of client system 630, AR/VR or social-networking system 660, and third-party system 670 may be physically or logically co-located with each other in whole or in part. Moreover, although FIG. 6 illustrates a particular number of client systems 630, AR/VR or social-networking systems 660, third-party systems 670, and networks 610, this disclosure contemplates any suitable number of client systems 630, AR/VR or social-networking systems 660, third-party systems 670, and networks 610. As an example and not by way of limitation, network environment 600 may include multiple client system 630, AR/VR or social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, AR/VR or social-networking system system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a client application 632 operable to provide various computing functionalities, services, and/or resources, and to send data to and receive data from the other entities of the network 610, such as the AR/VR or social-networking system 660 and/or the third-party system 670. For example, the client application 632 may be a social-networking application, an artificial-intelligence related application, a virtual reality application, an augmented reality application, an artificial reality or a mixed reality application, a camera application, a messaging application for messaging with users of a messaging network/system, a gaming application, an internet searching application, etc.

In particular embodiments, the client application 632 may be storable in a memory and executable by a processor of the client system 630 to render user interfaces, receive user input, send data to and receive data from one or more of the AR/VR or social-networking system 660 and the third-party system 670. The client application 632 may generate and present user interfaces to a user via a display of the client system 630.

In particular embodiments, AR/VR or social-networking system 660 may be a network-addressable computing system that can host an online Virtual Reality environment, an augmented reality environment, or social network. AR/VR or social-networking system 660 may generate, store, receive, and send social-networking data, such as, for example, user-profile data, concept-profile data, social-graph information, or other suitable data related to the online social network. Social-networking or AR/VR system 660 may be accessed by the other components of network environment 600 either directly or via network 610. As an example and not by way of limitation, client system 630 may access social-networking or AR/VR system 660 using a web browser, or a native application associated with social-networking or AR/VR system 660 (e.g., a mobile social-networking application, a messaging application, another suitable application, or any combination thereof) either directly or via network 610. In particular embodiments, social-networking or AR/VR system 660 may include one or more servers 662. Each server 662 may be a unitary server or a distributed server spanning multiple computers or multiple datacenters. Servers 662 may be of various types, such as, for example and without limitation, a mapping server, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking or AR/VR system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking or AR/VR system 660, or a third-party system 670 to manage, retrieve, modify, add, or delete, the information stored in data store 664.

In particular embodiments, social-networking or AR/VR system 660 may store one or more social graphs in one or more data stores 664. In particular embodiments, a social graph may include multiple nodes-which may include multiple user nodes (each corresponding to a particular user) or multiple concept nodes (each corresponding to a particular concept)—and multiple edges connecting the nodes. Social-networking or AR/VR system 660 may provide users of the online social network the ability to communicate and interact with other users. In particular embodiments, users may join the online social network via social-networking or AR/VR system 660 and then add connections (e.g., relationships) to a number of other users of social-networking or AR/VR system 660 to whom they want to be connected. Herein, the term "friend" may refer to any other user of social-networking or AR/VR system 660 with whom a user has formed a connection, association, or relationship via social-networking or AR/VR system 660.

In particular embodiments, social-networking or AR/VR system 660 may provide users with the ability to take actions on various types of items or objects, supported by social-networking or AR/VR system 660. As an example and not by way of limitation, the items and objects may include groups or social networks to which users of social-networking or AR/VR system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking or AR/VR system 660 or by an external system of third-party system 670, which is separate from social-networking or AR/VR system 660 and coupled to social-networking or AR/VR system 660 via a network 610.

In particular embodiments, social-networking or AR/VR system 660 may be capable of linking a variety of entities. As an example and not by way of limitation, social-networking or AR/VR system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking or AR/VR system 660. In particular embodiments, however, social-networking or AR/VR system 660 and third-party systems 670 may operate in conjunction with each other to provide social-networking services to users of social-networking or AR/VR system 660 or third-party systems 670. In this sense, social-networking or AR/VR system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking or AR/VR system 660 also includes user-generated content objects, which may enhance a user's interactions with social-networking or AR/VR system 660. User-generated content may include anything a user can add, upload, send, or "post" to social-networking or AR/VR system 660. As an example and not by way of limitation, a user communicates posts to social-networking or AR/VR system 660 from a client system 630. Posts may include data such as status updates or other textual data, location information, photos, videos, links, music or other similar data or media. Content may also be added to social-networking or AR/VR system 660 by a third-party through a "communication channel," such as a newsfeed or stream.

In particular embodiments, social-networking or AR/VR system 660 may include a variety of servers, sub-systems, programs, modules, logs, and data stores. In particular embodiments, social-networking or AR/VR system 660 may include one or more of the following: a web server, a mapping server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking or AR/VR system 660 may also include suitable components such as network interfaces, security mechanisms, load balancers, failover servers, management-and-network-operations consoles, other suitable components, or any suitable combination thereof. In particular embodiments, social-networking or AR/VR system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking or AR/VR system 660 to one or more client systems 630 or one or more third-party system 670 via network 610. The web server may include a mail server or other messaging functionality for receiving and routing messages between social-networking or AR/VR system 660 and one or more client systems 630. An API-request server may allow a third-party system 670 to access information from social-networking or AR/VR system 660 by calling one or more APIs. An action logger may be used to receive communications from a web server about a user's actions on or off social-networking or AR/VR system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking or AR/VR system 660. A privacy setting of a user determines how particular information associated with a user can be shared. The authorization server may allow users to opt in to or opt out of having their actions logged by social-networking or AR/VR system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Figure 7:
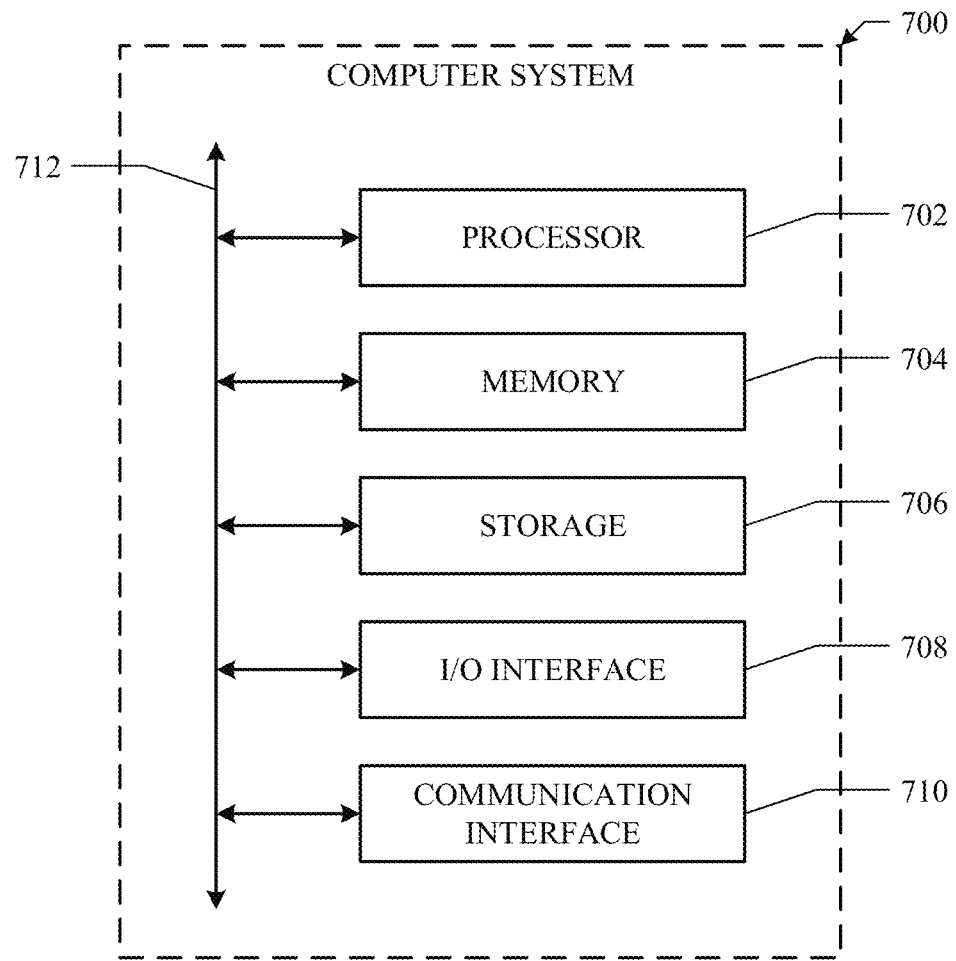
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    receiving a video comprising a plurality of image frames;
    generating, based on a first image frame of the plurality of image frames, an initial depth map using a machine-learning model;
    determining a misalignment error indicating depth misalignments in the initial depth map using a reprojection technique;
    generating one or more optimized camera parameters and a flexible deformation spline associated with the first image frame to minimize the misalignment error; and
    generating a refined depth map by adjusting the initial depth map associated with the first image frame using the flexible deformation spline associated with the first image frame, wherein the flexible deformation spline comprises a grid in which one or more intersections of the grid are deformed outward or inward along a ray cast from the one or more optimized camera parameters to the grid.

2. The method of claim 1, further comprising:
    identifying whether an object in the first image frame is a dynamic object or a static object; and
    wherein the generating the refined depth map is further based on whether the object in the first image frame comprises the dynamic object or the static object.

3. The method of claim 1, wherein the determining the misalignment error using the reprojection technique comprises:
    determining, based on a first portion corresponding to a static object in the first image frame, an estimated camera pose and an estimated depth value associated with the first portion of the first image frame;
    projecting the first portion corresponding to the static object into a three-dimensional space;
    reprojecting to a location associated with the first portion corresponding to the static object from the three-dimensional space towards a second estimated camera pose associated with a second portion corresponding to the static object in a second image frame;
    comparing the reprojected location with a tracked location of the second portion in the second image frame; and
    determining a reprojection error based on the comparison, wherein the reprojection error comprises the misalignment error indicating the depth misalignments in the initial depth map.

4. The method of claim 1, wherein the refined depth map resolve low-frequency inconsistencies in the initial depth map.

5. The method of claim 1, further comprising:
    applying a geometry-aware depth filter to resolve fine-scale details in the refined depth map.

6. The method of claim 1, wherein generating the one or more optimized camera pose for the first image frame comprises:
    adjusting one or more of rotation, translation, or intrinsic parameters of the camera until the depth map associated with the first image frame aligns or the misalignment error is below a certain threshold.

7. The method of claim 1, wherein the generating the flexible deformation spline associated with the first image frame comprises:
adjusting coordinates of a mesh or a grid representing the depth map of the first image frame along a spline until the depth map associated with the first image frame aligns or the misalignment error is below a certain threshold.

8. The method of claim 2, further comprising:
using automatic segmentation-based masks to affect geometric alignment requirements in regions comprising dynamic objects.

9. The method of claim 1, wherein the machine-learning model comprises a pretrained single-image depth estimation model.

10. The method of claim 2, wherein the depth misalignments in the initial depth map occur from inconsistencies between locations of one or more static objects.

11. One or more computer-readable non-transitory storage media embodying software that is operable when executed to:
receive a video comprising a plurality of image frames;
generate, based on a first image frame of the plurality of image frames, an initial depth map using a machine-learning model;
determine a misalignment error indicating depth misalignments in the initial depth map using a reprojection technique;
generate one or more optimized camera parameters and a flexible deformation spline associated with the image frame to minimize the misalignment error; and
generate a refined depth map by adjusting the initial depth map associated with the first image frame using the flexible deformation spline associated with the first image frame, wherein the flexible deformation spline starts off as a uniform grid in which one or more intersections of the grid are deformed outward or inward along a ray cast from the one or more optimized camera parameters to the grid.

12. The one or more computer-readable non-transitory storage media of claim 11, wherein the one or more optimized camera parameters comprises a camera rotation matrix or a camera translation.

13. The one or more computer-readable non-transitory storage media of claim 11, further operable when executed to:
determine, based on a first portion corresponding to a static object in the first image frame, an estimated camera pose and an estimated depth value associated with the first portion of the first image frame;
project the first portion corresponding to the static object into a three-dimensional space;
reproject to a location associated with the first portion corresponding to the static object from the three-dimensional space towards a second estimated camera pose associated with a second portion corresponding to the static object in a second image frame;
compare the reprojected location with a tracked location of the second portion in the second image frame; and
determine a reprojection error based on the comparison, wherein the reprojection error comprises the misalignment error indicating the depth misalignments in the initial depth map.

14. The one or more computer-readable non-transitory storage media of claim 11, wherein the one or more optimized camera parameters comprises one or more of orientation, rotation, translation, or intrinsic parameters of a camera.

15. The one or more computer-readable non-transitory storage media of claim 11, further operable when executed to:
apply a geometry-aware depth filter to achieve high-frequency depth alignment.

16. A system comprising:
one or more processors; and
one or more computer-readable non-transitory storage media coupled to the one or more of the processors and comprising instructions operable when executed by the one or more of the processors to cause the system to:
receive a video comprising a plurality of image frames;
generate, based on a first image frame of the plurality of image frames, an initial depth map using a machine-learning model;
determine a misalignment error indicating depth misalignments in initial depth maps using a reprojection technique;
generate one or more optimized camera parameters and a flexible deformation spline associated with the first image frame to minimize the misalignment error; and
generate a refined depth map by adjusting the initial depth map associated with the first image frame using the flexible deformation spline associated with the first image frame, wherein the flexible deformation spline comprises a grid in which one or more intersections of the grid are deformed outward or inward along a ray cast from the one or more optimized camera parameters to the grid.

17. The system of claim 16, wherein the one or more processors are further operable when executing the instructions to cause the system to:
identify whether an object in the first image frame comprises a dynamic object or a static object; and
wherein the generate the refined depth map is further based on whether the object in the first image frame comprises the dynamic object or the static object.

18. The system of claim 16, wherein to determine the misalignment error using the reprojection technique, the one or more processors are further operable when executing the instructions to cause the system to:
determine, based on a first portion corresponding to a static object in the first image frame, an estimated camera pose and an estimated depth value associated with the first portion of the first image frame;
project the first portion corresponding to the static object into a three-dimensional space;
reproject to a location associated with the first portion corresponding to the static object from the three-dimensional space towards a second estimated camera pose associated with a second portion corresponding to the static object in a second image frame;
compare the reprojected location of the second portion with a tracked location of the second portion in the second image frame; and
determine a reprojection error based on the comparison, wherein the reprojection error comprises the misalignment error indicating the depth misalignments in the initial depth map.

19. The system of claim 16, wherein the refined depth map achieves low-frequency depth alignment.

20. The system of claim 16, wherein the one or more processors are further operable when executing the instructions to cause the system to:

apply a geometry-aware depth filter to resolve fine-scale details in the refined depth map or to achieve high-frequency depth alignment.

* * * * *